(12) United States Patent
Clark et al.

(10) Patent No.: US 8,954,413 B2
(45) Date of Patent: Feb. 10, 2015

(54) METHODS AND APPARATUS FOR ADAPTIVELY HARVESTING PERTINENT DATA

(75) Inventors: Abraham J. Clark, Miami, FL (US); John Clark, Dale City, VA (US)

(73) Assignee: Thermopylae Sciences and Technology, North Arlington, VA (US)

( * ) Notice: Subject to any disclaimer, the term of this patent is extended or adjusted under 35 U.S.C. 154(b) by 256 days.

(21) Appl. No.: 13/085,141

(22) Filed: Apr. 12, 2011

(65) Prior Publication Data

US 2011/0252021 A1 Oct. 13, 2011

Related U.S. Application Data

(60) Provisional application No. 61/323,054, filed on Apr. 12, 2010.

(51) Int. Cl.
G06F 17/30 (2006.01)

(52) U.S. Cl.
CPC .................................. *G06F 17/30867* (2013.01)
USPC ............ 707/706; 707/726; 707/749; 707/803

(58) Field of Classification Search
USPC .................. 707/706, 708, 723, 726, 732, 749
See application file for complete search history.

(56) References Cited

U.S. PATENT DOCUMENTS

| | | | |
|---|---|---|---|
| 7,685,083 B2 * | 3/2010 | Fairweather | 706/45 |
| 7,813,822 B1 * | 10/2010 | Hoffberg | 700/94 |
| 7,827,125 B1 * | 11/2010 | Rennison | 706/14 |
| 2004/0049472 A1 * | 3/2004 | Hayashi et al. | 706/13 |
| 2005/0120015 A1 * | 6/2005 | Marum Campos et al. | 707/5 |
| 2005/0179719 A1 * | 8/2005 | Kim | 347/19 |
| 2006/0294085 A1 * | 12/2006 | Rose et al. | 707/3 |
| 2006/0294086 A1 * | 12/2006 | Rose et al. | 707/3 |
| 2006/0294134 A1 * | 12/2006 | Berkhim et al. | 707/102 |
| 2007/0112761 A1 * | 5/2007 | Xu et al. | 707/5 |
| 2007/0156677 A1 * | 7/2007 | Szabo | 707/5 |
| 2008/0005073 A1 * | 1/2008 | Meek et al. | 707/3 |
| 2008/0228544 A1 * | 9/2008 | Woosley et al. | 705/8 |
| 2008/0235629 A1 * | 9/2008 | Porter et al. | 715/849 |
| 2009/0282023 A1 * | 11/2009 | Bennett | 707/5 |
| 2010/0082684 A1 * | 4/2010 | Churchill et al. | 707/784 |
| 2010/0250337 A1 * | 9/2010 | Kassaei | 705/10 |
| 2010/0250578 A1 * | 9/2010 | Athsani et al. | 707/765 |
| 2010/0280985 A1 * | 11/2010 | Duchon et al. | 706/52 |

* cited by examiner

*Primary Examiner* — Hanh Thai (74) *Attorney, Agent, or Firm* — MH2 Technology Law Group, LLP (57) ABSTRACT

Methods and apparatus are provided for developing user profiles via search query analysis and linking the user profiles and data sources, to adaptively facilitate the discovery, transfer, and distribution of pertinent knowledge. A user profile builder, linker, and manager analyze users' search queries to learn their interests and habits, build user profiles to reflect the users' interests and habits, and link together profiles of the users with common interests. A data harvester utilizes the user profiles to provide pertinent data to the users based on their interests and habits or those of other users with common interests.

22 Claims, 10 Drawing Sheets

METHODS AND APPARATUS FOR ADAPTIVELY HARVESTING PERTINENT DATA

CLAIM OF PRIORITY

The present application relates to U.S. Provisional Application No. 61/323,054 filed Apr. 12, 2010, entitled "Methods and Apparatus for Adaptively Harvesting Pertinent Data," by Abraham J. Clark and John Clark, from which provisional application priority is claimed, and which provisional application is incorporated by reference herein.

FIELD

The present teachings relate generally to methods and apparatus for developing user profiles through search query analyses and linking the user profiles and data sources, to adaptively facilitate the discovery, transfer, and distribution of pertinent data and knowledge.

BACKGROUND

The emergence of the World Wide Web has provided terrorists with an inexpensive, ubiquitous, and anonymous means for acquiring information and exercising command and control over their operations. For example, Mohamed Atta, the operational leader of the 9/11 attack, researched U.S. flight schools via the Internet from Hamburg, Germany. Targets of intelligence collection have become more sophisticated, thus rendering surveillance and accurate threat assessments more difficult.

Despite the problems that the Internet and other information and communication technologies create, they can also be a part of the solution to these problems. However, such technologies produce best results when an organization has the doctrine, structure, and incentives to exploit those technologies. For example, as long as intelligence agencies' personnel and security systems continue to incentivize information withholding instead of information sharing, even the best information technology would not significantly boost information sharing. Furthermore, the sheer volume of information on the Internet would require individual analysts to spend an inordinate amount of time researching and searching for pertinent data.

In addition, with information portals and portlets on classified systems like Intelink and Secret Internet Protocol Router Network (SIPRNet), analysts have to spend more time seeking and collecting information than actually analyzing the information. The exponential growth in the volume of information means that analysts would have to spend a disproportionate and possibly redundant amount of time and effort searching for pertinent data or critical threads of information. Therefore, analysts throughout the intelligence community, e.g., the Open-Source Intelligence (OSINT) Laboratory of the Defense Intelligence Agency, are faced with an unenviable task of having to gather massive amounts of data from diverse sources and organize this data in a format to conduct and expedite intelligence gathering. In the past and at present time, to manage the massive amount of data, the intelligence community has devoted tremendously powerful but also hugely expensive computing resources, e.g., arrays of supercomputers, to attack this problem with a "brute strength" approach.

SUMMARY

According to the present teachings in one or more aspects, methods and apparatus are provided to adaptively facilitate the discovery, transfer, and distribution of pertinent data and knowledge, in which users' search queries and/or data provided in response to the search queries are analyzed and user profiles are developed based on results of the search query analyses. Exemplary embodiments of the present disclosure factor in the interests and habits of the users, either individually or collectively, to harvest pertinent data and information to assist, enhance, and streamline the searches.

In exemplary embodiments, a profile builder monitors user search queries for data via information portals, e.g., web portals and enterprise portals, and builds user profiles for users in a network or networks based on one or more parameters, such as search terms and concepts associated with the search queries, search results provided in response to the search queries, a frequency in which certain search terms and/or concepts are used in the search queries, the number of users making similar search queries, and the like. A search term can include, for instance, a name, a place, an object, a temporal entry, a geospatial entry, and the like. A concept can include, for example, a topic of interest or a context of the search queries identified or inferred from the search terms. Over time, the user profiles develop a baseline of understanding of the users' interests and habits.

According to the present teachings in one or more aspects, the profile builder can analyze users' search queries to identify one or more concepts related to the search queries. The profile builder can build and develop individual user profiles based on the concepts related to each user's search queries or search results provided in response to the search queries, so that a data harvester can adaptively identify pertinent data for that user based on her user profile. The profile builder can also build and develop the user profiles based on a frequency in which particular search terms and/or concepts are used in the search queries. The data harvester, equipped with an understanding of a user's interests and habits stored in the user's profile, can target data sources and/or monitor other users' profiles or search queries to identify new data that may be pertinent or of interest to the user. Data sources can include data repositories, data feeds, web sites, web portals, and the like. If the data harvester determines that the new data is pertinent to the user, for example, if the data harvester determines that the new data is a conceptual match to the user's interests, then the data harvester notifies the user of the new data and/or transmits the new data to the user.

In further embodiments, a profile linker can link a user profile to profiles of other users based on, for example, search terms or concepts that the users share. For instance, the profile linker can monitor the users' search queries and automatically link the user profiles of users with common interests together. The profile linker can track search queries of the other users whose profiles are linked to the user's profile, and the data harvester can identify pertinent data for the user based on the linked users' search queries or responses to those search queries. The profile linker can also help the data harvester identify pertinent data for the user using concepts associated with the linked users' profiles. Furthermore, the profile linker can rank other users based on a similarity of the other users' profiles to the user's profile, and then display the other users according to their ranked similarity.

In additional embodiments, a profile manager enables users or administrators to view or modify user profiles through a user interface, separately from user-entered search queries. The profile manager can enable users or administrators to, for example, change a ranking of search terms or concepts identified or inferred from a user's search queries or search results provided in response to those search queries, change a clustering or grouping of the search terms or concepts, remove search terms used in the user's search queries, search for other users that share similar interests and/or include similar concepts in their user profiles, merge the user's concepts with concepts associated with other users' profiles, remove a concept from the user profile, or associate a new concept with the user profile. According to aspects of the present teachings, the profile manager can assist trainers and management in reviewing the user profiles and the users' analytical patterns, for example, by displaying a development history or snapshots of the user profiles on an individual or a collective basis. For instance, the profile manager can create a visual display to illustrate the growth of a user's knowledge related to a concept and the search strategies, tactics, techniques, and procedures that the user employed to find information pertinent to the concept.

Exemplary embodiments of the present teachings, including the data harvester and the profile builder, linker, and/or manager, adaptively facilitate the discovery, transfer, and distribution of pertinent data and knowledge to users by analyzing the users' search queries to determine and learn their interests and habits, linking together users with common interests, and providing pertinent data to the users based on their interests and habits or those of other users with common interests. By factoring in the interests and habits of the users, either individually or collectively, the exemplary embodiments can greatly reduce the time and resources required to search for and gather data and information pertinent or of interest to a user while improving the relevance and usefulness of the gathered data. Moreover, the exemplary embodiments can monitor data sources and/or other users' activities around the clock to identify new data that may be pertinent to the user, thus reducing the normal surge of search queries during typical working hours, which has the benefit of load balancing the computing resources devoted to searching for and gathering data. Furthermore, by linking together user profiles that share common interests, the users are connected to one another to facilitate the collaboration and exchange of information and knowledge between the users.

DESCRIPTION OF THE DRAWINGS

The accompanying drawings, which are incorporated in and constitute a part of this specification, illustrate aspects of the present teachings and together with the description, serve to explain principles of the present teachings. In the figures:

FIGS. 4-7 show screenshots of exemplary graphical user interfaces and user profiles associated with the data harvest system, according to an embodiment of the present teachings.

DETAILED DESCRIPTION

Reference will now be made in detail to exemplary embodiments of the present teachings, an example of which is illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific embodiments in which may be practiced. These embodiments are described in sufficient detail to enable those skilled in the art to practice these embodiments and it is to be understood that other embodiments may be utilized and that changes may be made without departing from the scope of the present teachings. The following description is, therefore, merely exemplary.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Figure 1A:
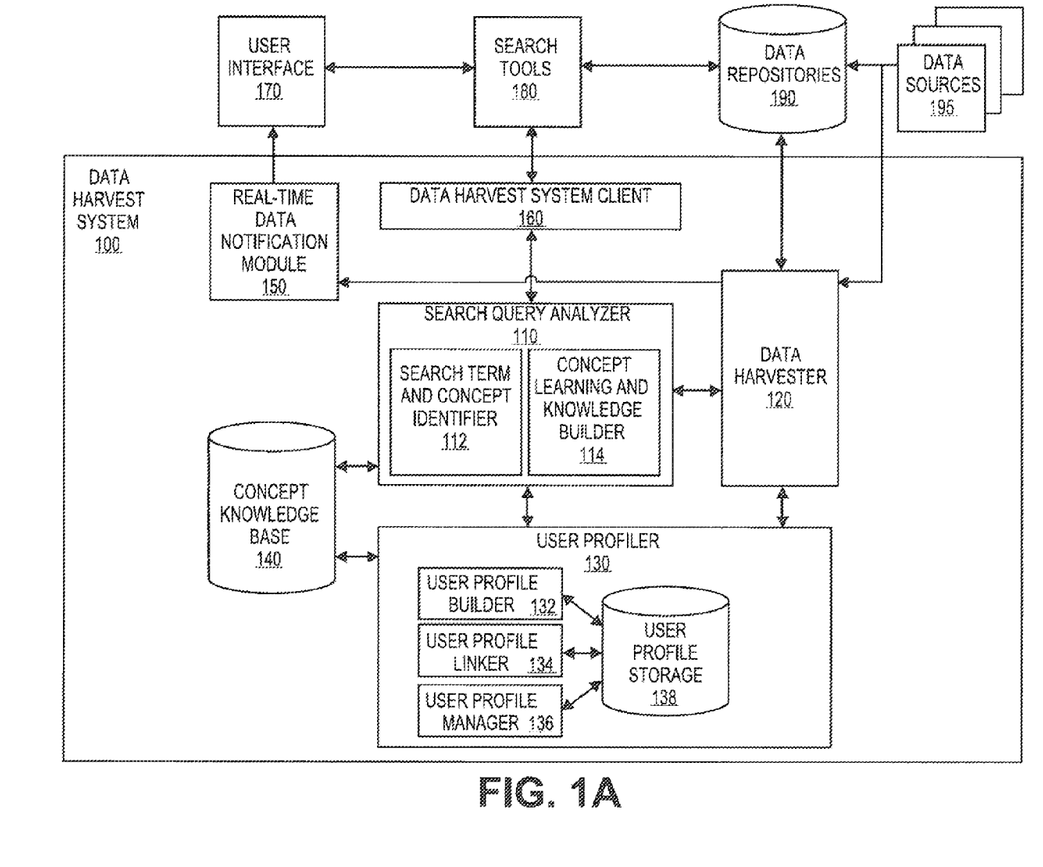
FIG. 1A illustrates an exemplary data harvest system that analyzes search queries, builds and links user profiles based on the search query analyses, and adaptively facilitates the discovery, transfer, and distribution of pertinent data and knowledge based on the user profiles, consistent with various embodiments of the present teachings.

FIG. 1A illustrates an exemplary data harvest system 100 that analyzes search queries and develops user profiles based on the analyses of the search queries, to adaptively facilitate the discovery, transfer, and distribution of pertinent data and knowledge. More particularly, in various aspects, and as generally shown in the figures, platforms and techniques are provided in which users' search queries are analyzed to build and link user profiles, and pertinent data and knowledge are adaptively discovered, transferred, and distributed based on the user profiles.

Data harvest system 100 operates as a search aid, the primary functions of which are to facilitate knowledge discovery, knowledge transfer, knowledge distribution, and user training. Data harvest system 100 can include a backend analytical engine and can provide a graphical user interface (GUI) based dashboard. In an embodiment as shown in FIG. 1A, the backend analytical engine can include a search query analyzer 110 and a data harvester 120, and the GUI-based dashboard can include a user interface 170 and search tools 180. The backend analytical engine can interface with the GUI-based dashboard via a real-time data notification module 150 and a data harvest system client 160. Search query analyzer 110 can include a search term and concept identifier 112 and a concept learning and knowledge builder 114, and can store and retrieve concepts and search terms in a concept knowledge base 140.

Figure 4A:
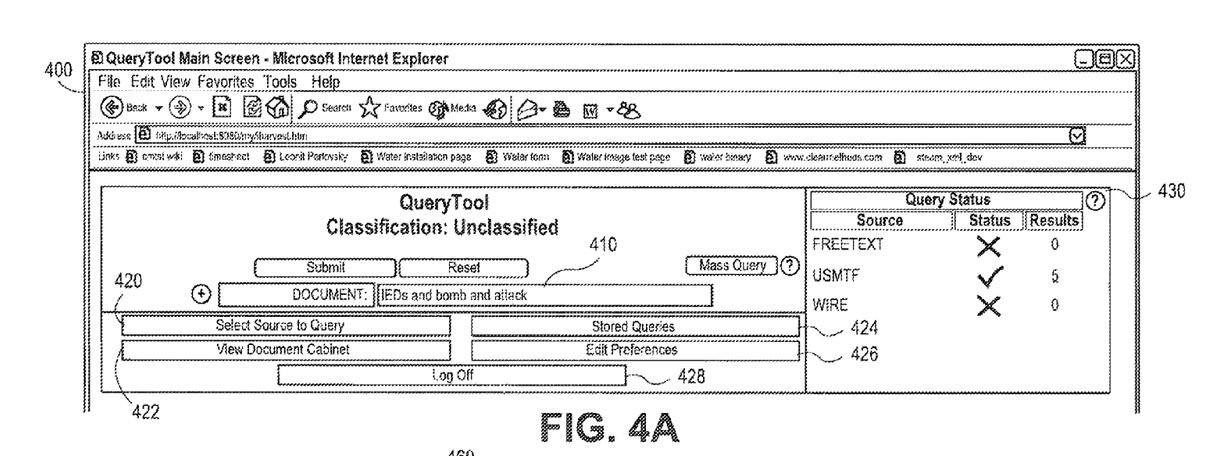
Figure 4B:
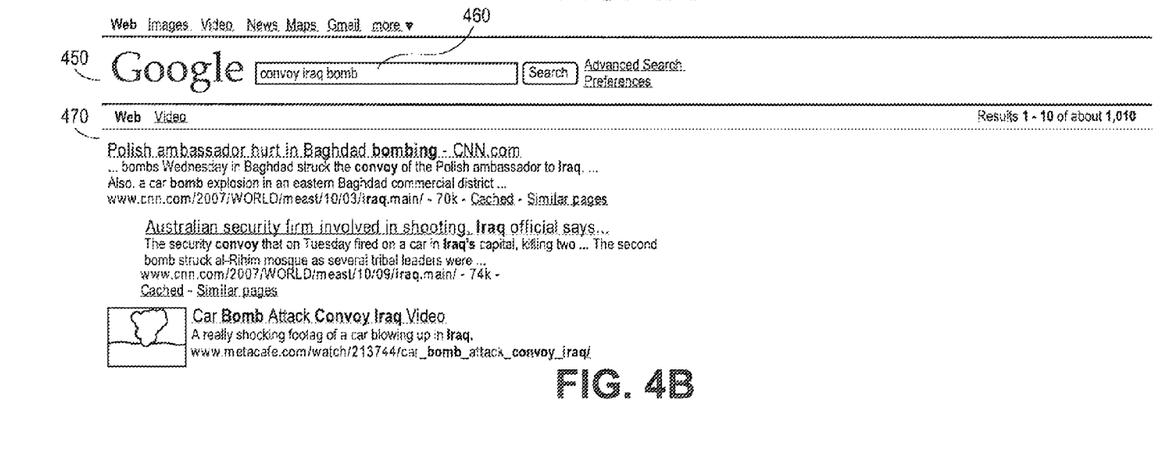

In various embodiments, concept knowledge base 140 is a database system that provides for the collection, organization, and retrieval of search terms, concepts, and other types of knowledge. Concepts can include, for example, topics of interest, search contexts, and other types of information that can be identified or inferred from a user's search activities, such as search terms in the user's search queries, search results returned in response to the search queries, and the like. Concept knowledge base 140, in conjunction with search query analyzer 110 and/or user profiler 130, enables data harvest system 100 to identify, create, represent, and distribute concepts and topics of interest. The backend analytical engine can continuously or periodically monitor search tools 180, such as web portals and existing search engines, examples of which are shown in FIGS. 4A and 4B and described in greater detail below. In doing so, the backend analytical engine can determine and learn what a user is interested in based on search terms, syntax, and/or context used in the user's search queries, such as names, places, things, temporal entries, geospatial entries, and the like.

Data harvest system 100 can automatically create a new user profile for a new user such as, for instance, a user logging onto data harvest system 100 for the first time. Data harvest system 100 can continue to develop an existing user profile automatically in the background as the user conducts searches using search tools 180, to develop and refine a model of the user's interests, habits, search contexts, etc. A user profile includes a collection of concepts associated with a user, the concepts including topics of interest and/or search contexts, and can be linked to other user profiles. The topics of interest describe the various topics and/or topic areas that the user is likely interested in, e.g., topics that the user has been searching on, for example, via query queries, topics that have been added or merged to the user profile by the user or an administrator, and the like. Each concept can include a series of weighted atoms, where atoms are fundamental units of information, such as words, geographic locations, documents, and the like. Atoms can be assigned weights by user profile builder 132 to provide value and context to concepts associated with the user. The collection of concepts can be created and developed over time based on the user's search queries and/or search results returned in response to the search queries, and can also be modified based on concepts associated with the linked user profiles. Based on the user's profile, data harvest system 100 can adaptively harvest data pertinent or of interest to the user, and can then send the pertinent data or a notification thereof to the user upon or immediately after harvesting the pertinent data. As such, data harvest system 100 can function as a substantially real-time tipping tool. For example, and as described in greater detail below, upon harvesting information content identified as being pertinent to the user, data harvest system 100 can use real-time data notification module 150 to transmit, in substantially real-time, the harvested information content to one or more targeted devices of the user communicatively coupled to data harvest system 100. In the embodiment shown in FIG. 1A, data harvest system 100 can include a user profiler 130 comprising a user profile builder 132, a user profile linker 134, a user profile manager 136, and user profile storage 138.

Figure 5A:
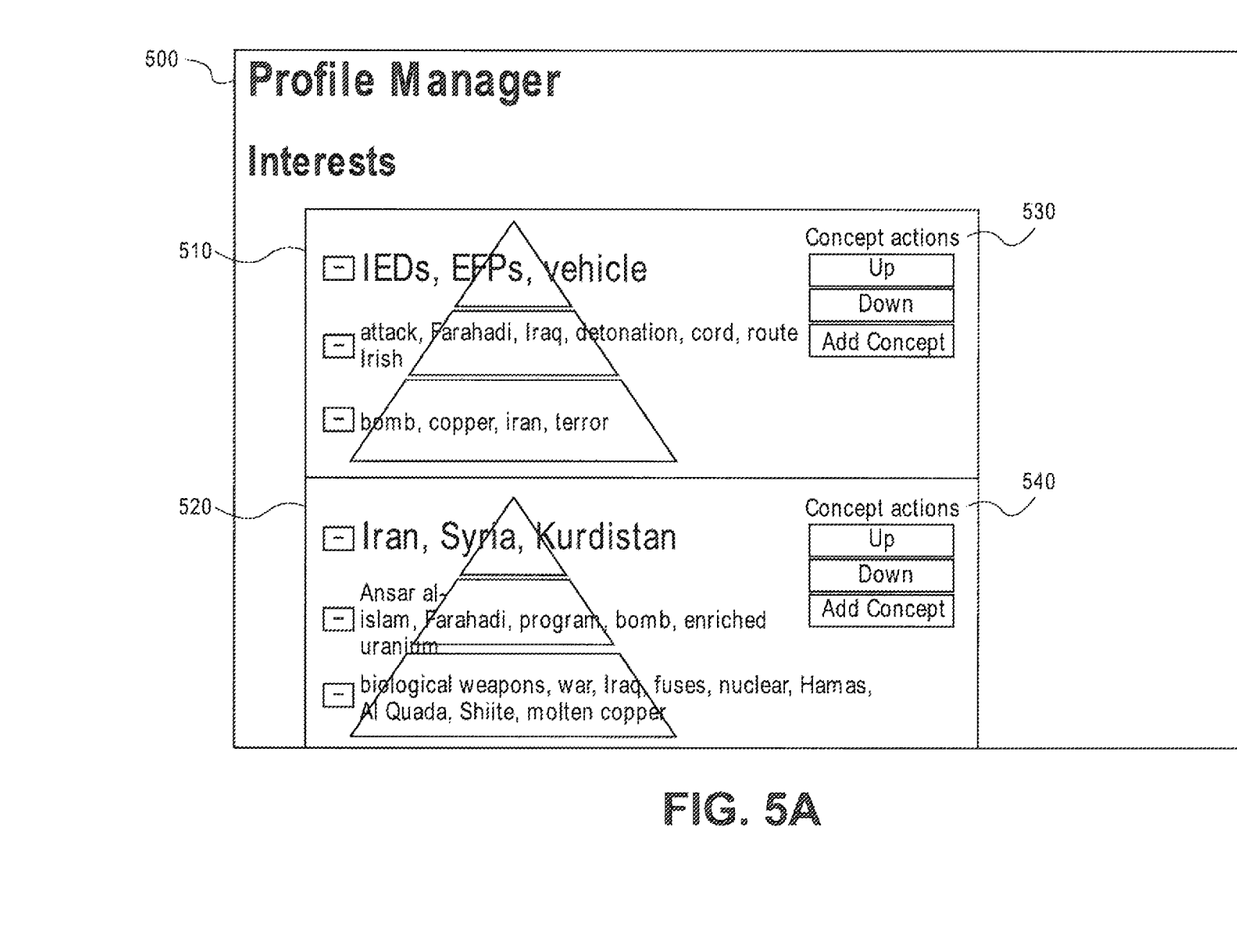
Figure 5B:
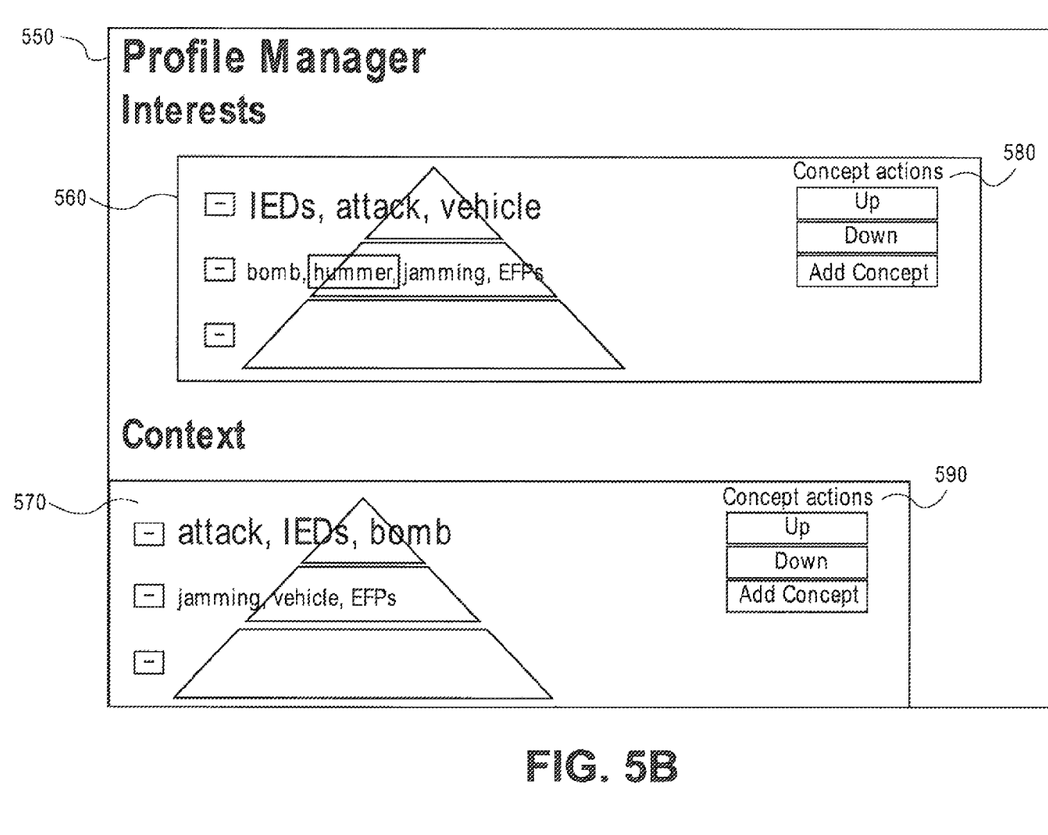

User profile builder 132 can, independently or in conjunction with search query analyzer 110, analyze users' search queries and syntax thereof, to identify or infer one or more concepts related to the search queries and to associate the concepts with the users' profiles. A concept can include, for example, a topic of interest, a search context, and other types of information that can be identified or inferred from the user's search activity, such as search terms used in the user's search queries, search results returned in response to the search queries, and the like. User profile builder 132 can build individual user profiles by associating each user's profile with concepts identified as being related to that user's search queries or search results provided in response to the search queries. Using the user profiles built by user profile builder 132, data harvester 120 can analyze concepts associated with one or more of the user profiles and adaptively identify and harvest data pertinent or of interest to one or more users. User profile builder 132 can also build the user profiles based on a frequency in which particular search terms and/or concepts are used in the search queries. Exemplary representations of user profiles at various stages of development are illustrated in FIGS. 5A and 5B and described in greater detail below. For example, a senior user profile can include a well-defined model of the senior user's interests, habits, and search contexts. A well-defined model can be developed by conducting search query analyses on a high number of search queries and/or over a long period of time, merging concepts from other user profiles, managing concepts using user profile manager 136, and the like. On the other hand, a junior user profile can include an incomplete model of the junior user's interests, habits, and search contexts. User profile builder 132 can also classify and/or rank search terms and concepts in the user profile according to how frequently they have been used in the user's search queries.

User profile linker 134 can link a user profile to profiles of other users in a network or networks based on, for example, search terms or concepts that the users share. User profile linker 134 can monitor the users' search queries and automatically link together the profiles of users having shared concepts, e.g., common interests, similar search contexts, and the like. User profile linker 134 can track or assist data harvester 120 in tracking search queries of the other users whose profiles are linked to the user's profile, and data harvester 120 can analyze the shared concepts and identify data pertinent or of interest to the user based on the other users' search queries or search results returned for those search queries. FIG. 6 illustrates exemplary pertinent data harvested by data harvest system 100. User profile linker 134 can also rank the other users based on a similarity between the other users' profiles and the user's profile, and then display the other users according to their ranked similarity. The user's profile can include a collection of concepts associated with the user, and each concept can include a series of weighted atoms. User profile linker 134 can use the weighted atoms to calculate or generate a distance between two concepts associated with the user's profile, and can use the calculated distance to generate a visualization of the user's profile. Furthermore, user profile linker 134 can score the concepts in the user's profile against the concepts in the other users' profiles using mathematical and vector based functions, to determine a similarity score ranging from 0.0 (e.g., no commonality) to 1.0 (e.g., identical contents) between the user's profile and one or more other users' profiles. In various embodiments, user profile linker 134 can enhance the ability of data harvester 120 to identify and harvest pertinent data by using search terms or concepts associated with the linked user profiles. Frequently, users only know what their immediate peers are searching for. Embodiments of data harvest system 100 enable users in a network or networks to find and collaborate with other users that have common interests or shared concepts, regardless of their locations or affiliated agencies, thus facilitating the discovery, transfer, and distribution of pertinent data or knowledge.

Data harvester 120, equipped with an understanding of the user's interests and habits stored in the user's profile, can target data repositories 190 and/or data sources 195, and can also monitor other users' profiles or search queries to identify new data that may be pertinent or of interest to the user. Data repositories 190 can include databases, files, and the like, which contain content or data that a user can search for, examples of which include Distributed Common Ground System-Army (DCGS-A) Brain and Defense Intelligence Agency's Intelligence Community Data Layer (ICDL) Organic Theater data stores. Data sources 195 can include data feeds, web sites, networks, and the like.

In various embodiments, if data harvester 120 identifies or determines that the new data is pertinent to the user, for example, if data harvester 120 determines that the new data is a conceptual match to the user's interests, then data harvester 120 harvests the data and notifies the user of the harvested data and/or transmits the harvested data to the user. For instance, if a first user queries for "Nebraska, Idaho, and potatoes," and then a second user queries for "Idaho and potatoes," the data harvester can notify the second user of the first user's search query that includes "Nebraska" or the response to that search query because the second user's search is similar to that of the first user, and thus data harvester 120 can infer that the second user may also be interested in "Nebraska." This serves to alert the second user of hidden data, which the second user may not have been aware of at the time of his query but could be pertinent or of interest to the second user.

In the embodiment shown in FIG. 1A, data harvester 120 can notify the user of harvested data using real-time data notification module 150. In various embodiments, real-time data notification module 150 can transmit information content to a targeted device or a set of targeted devices communicatively coupled to data harvest system 100. The information content, which can include the harvested data or notification thereof, can be presented on a visual display or on audio speakers of the targeted devices. Information content can comprise visual, auditory, or sensory content, or a descriptor of a location to make such content accessible. For example, the information content can be in the form of an image, text, electronic mail, instant message, streaming or non-streaming video, streaming or non-streaming audio, a Universal Resource Locator, a Hyper Text Markup Language page (HTTP), an Extensible Markup Language (XML) document, an executable program, a filename, an Internet Protocol (IP) address, a telephone call, a pointer, or other forms of data content known to one skilled in the art. The information content can also be communicated to mobile devices via a communication protocol such as, for example, short messaging service, a standard form of telephony, a Wireless Application Protocol (WAP) page, multimedia messaging service, enhanced messaging service, WAP push, application push (e.g., a push registry), or standard internet protocols such as IP, Transmission Control Protocol, User Datagram Protocol, hypertext transfer protocol, File Transfer Protocol, or other protocols known to one skilled in the art.

Figure 7:
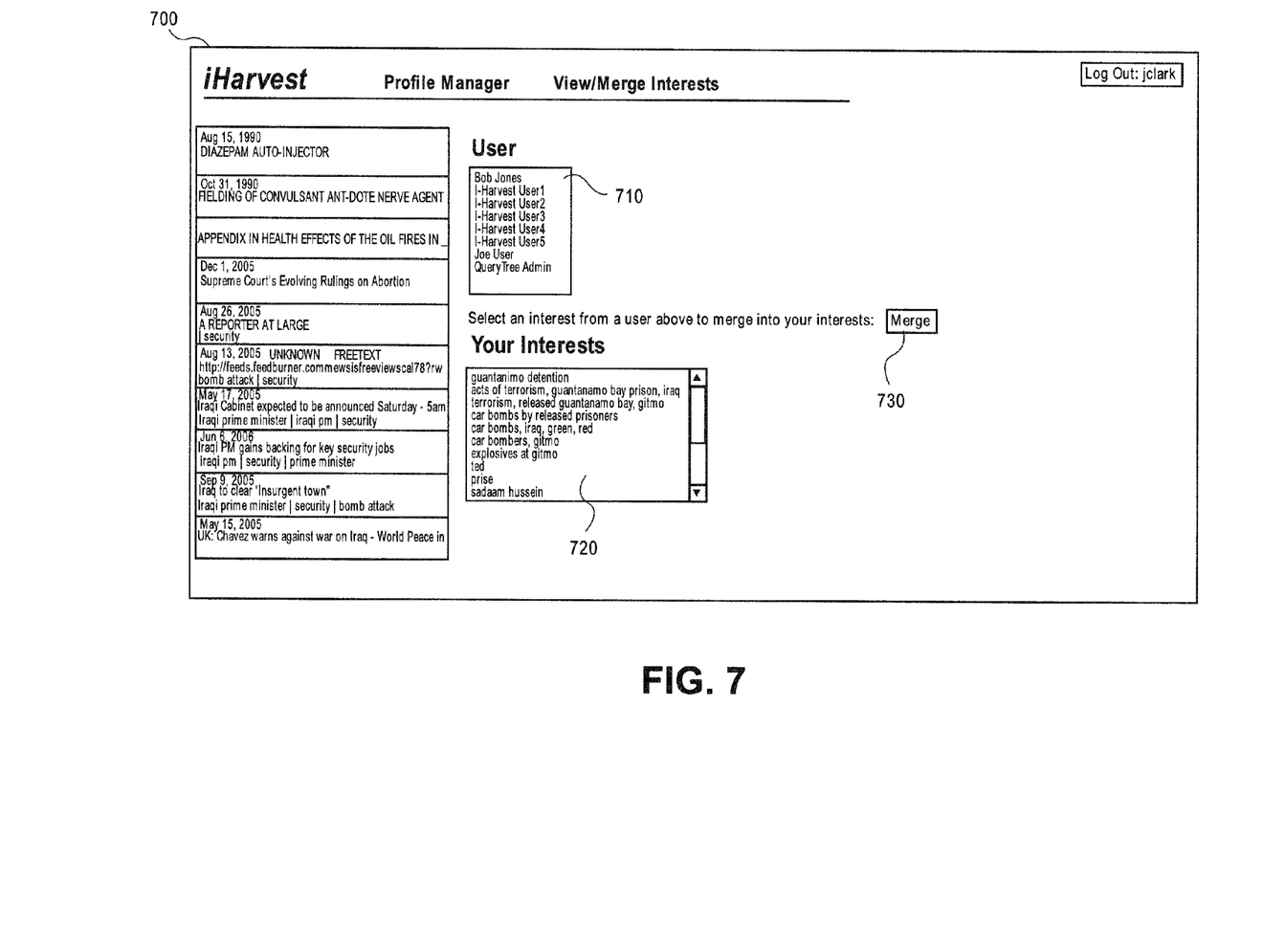

User profile manager 136 allows users to modify their profiles by changing a ranking of search terms or concepts identified or inferred from a user's search queries or search results provided in response to those search queries, change a clustering or grouping of the search terms or concepts, remove search terms used in the user's search queries, search for other users that share similar interests and/or include similar concepts in their user profiles, merge the user's concepts with concepts associated with other users' profiles, remove a concept from the user profile, or associate a new concept with the user profile. FIG. 7 illustrates an exemplary screenshot of user profile manager 136, in which user profile manager 136 displays concepts, such as topics of interest and search contexts, associated with a user and provides the user an option to merge, retrieve, or inherit another user's concepts with her own. User profile manager 136 can also assist trainers and management in reviewing the user profile and the user's analytical patterns, for example, by displaying a development history or snapshots of the user profiles on an individual or a collective basis. For instance, user profile manager 136 can create a visual display to illustrate the growth of a user's knowledge related to a concept and the search strategies, tactics, techniques, and procedures that the user employed to find information pertinent to the concept.

Figure 1B:
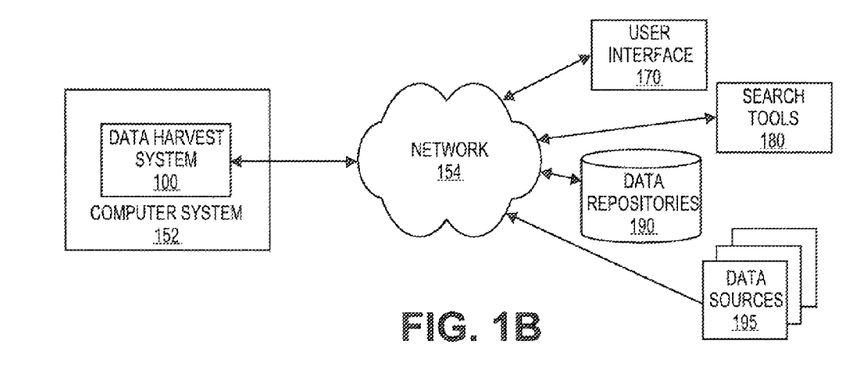
FIGS. 1B and 1C illustrate various embodiments of the data harvest system, consistent with various embodiments of the present teachings.

According to embodiments, data harvest system 100 can be implemented on any type of computer system, such as server computers, desktop computers, thin clients, virtual machines, laptops, mobile devices, tablet computers, smartphones, personal digital assistants, and the like. The computer system can include the components of a conventional computer system, for example, components as described below in FIG. 8. In embodiments, the computer system implementing data harvest system 100 can be configured to operate in conjunction with other computer systems. As illustrated in FIG. 1B, for example, data harvest system 100 can be implemented on a computer system 152 that is coupled to a network 154. Network 154 can included one or more communication networks, such as a local area network, a wide area network, the Internet, a cloud-based network, and the like. In this example, data harvest system 100 can provide and/or communicate with the user via network 154. For instance, data harvest system 100 can communicate with the user via a network based interface, such as user interface 170, which can include a web page, a web portal, an electronic mail application, a messaging application, a media player, and other types of network based interfaces known to one skilled in the art. As such, the user can utilize data harvest system 100, via user interface 170, from a remote computer system coupled to network 154. Additionally, data harvest system 100 can communicate with search tools 180, data repositories 190, and/or data sources 195 via network 154. For instance, search tools 180, data repositories 190, and/or data sources 195 can be supported by one or more remote computer systems coupled to network 154.

In the example illustrated in FIG. 1B, data harvest system 100 can provide user interface 170 via network 154 to a user of a remote computing system. Likewise, for example, data harvest system 100 can be locally stored and executed on a computer system of the user. As such, data harvest system 100 can provide user interface 170 as a GUI to allow the user to utilize data harvest system 100. Likewise, while search tools 180, data repositories 190, and data sources 195 are illustrated as being remotely located from the data harvest system 100, any of search tools 180, data repositories 190, and/or data sources 195 can be implemented locally on the computer system implementing data harvest system 100. One skilled in the art will realize that data harvest system 100, search tools 180, data repositories 190, and data sources 195, can be implemented on any type of computer system or systems configured in any type of arrangement.

Figure 1C:
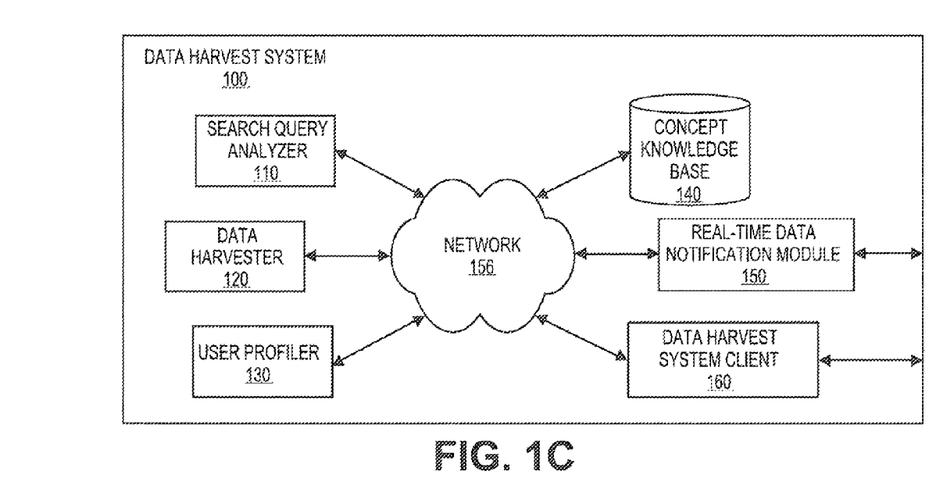
Figure 8:
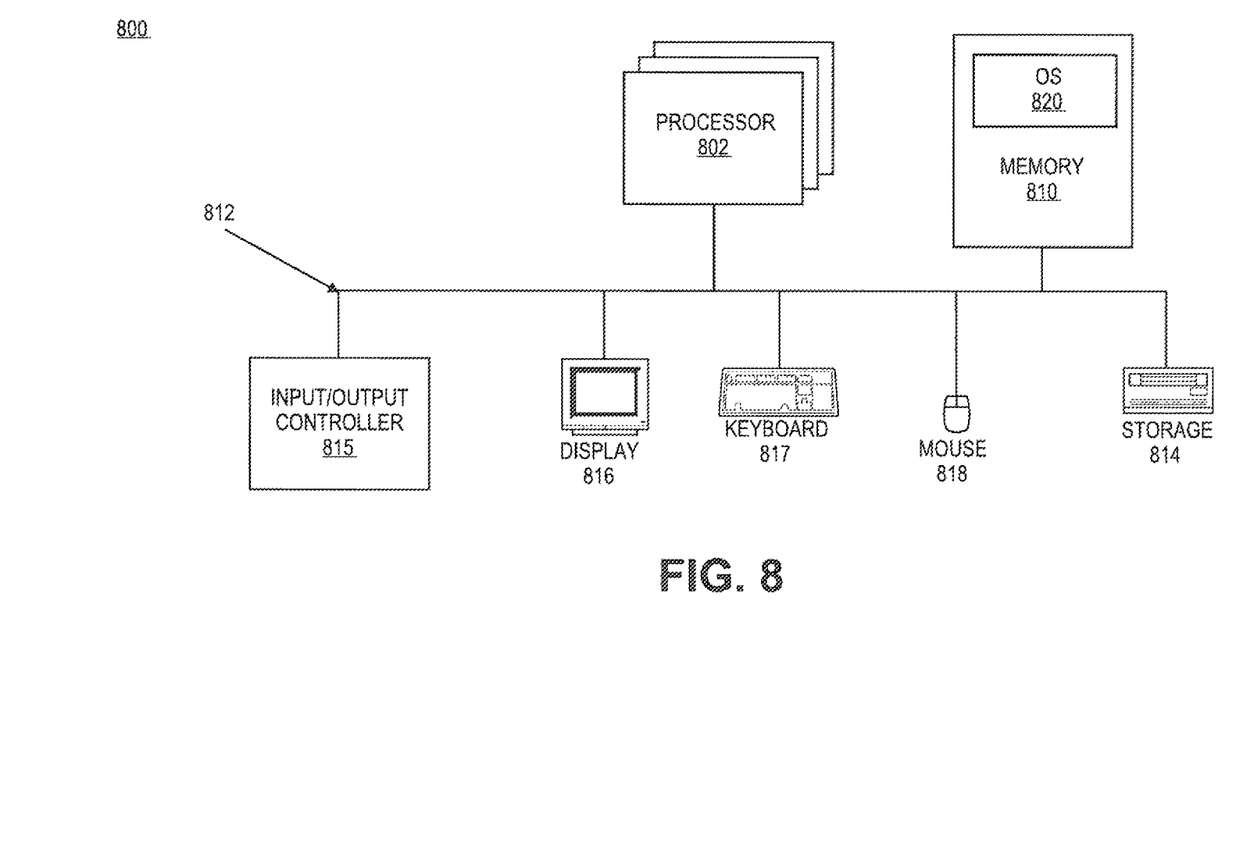
FIG. 8 illustrates a computer system that is consistent with embodiments of the present teachings.

In embodiments, data harvest system 100 can be implemented as an application program that is capable of being stored on and executed by an type of computer system, for example, as illustrated in FIG. 8. Data harvest system 100 an be written in a variety of programming languages, such as JAVA, C++, Python code, Visual Basic, HTML, XML, and the like to accommodate a variety of operating systems, computing system architectures, etc. The modules and/or components of data harvest system 100 can be implemented in a single application program capable of executing on any type of computer systems. Likewise, the modules and/or components of data harvest system 100 can be implanted as separate application programs that are capable of executing on separate computer systems. For example, as illustrated in FIG. 1C, the modules and/or components in data harvest system 100, such as search query analyzer 110, data harvester 120, user profiler 130, concept knowledge base 140, real-time data notification module 150, and/or data harvest system client 160, can be separate and can communicate via one or more communication networks 156. While FIG. 1C illustrates all the modules and/or components in data harvest system 100 are separate, any number of the modules and/or components in data harvest system 100 can be separate and/or located in the same application program.

The embodiments of data harvest system 100, such as those described herein and illustrated in FIGS. 1A-C, are intended to present concepts in a concrete fashion and are described in sufficient detail to enable those skilled in the art to practice these embodiments. However, other embodiments can be utilized and changes can be made without departing from the scope of the present teachings.

Figure 2:
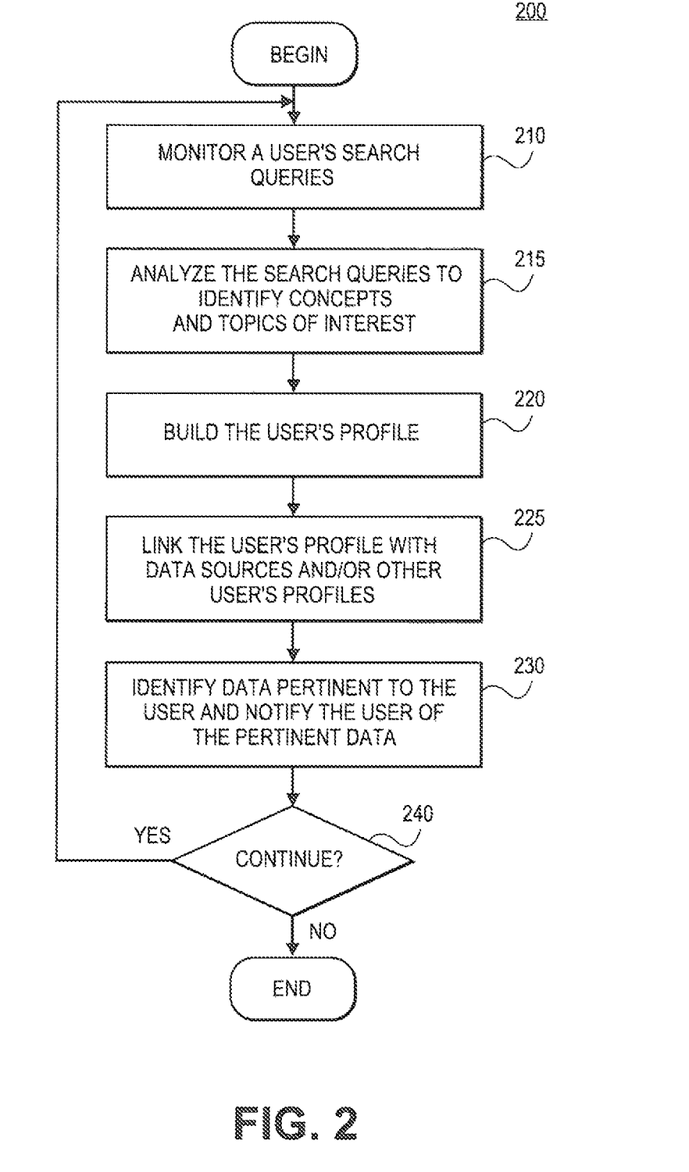
FIG. 2 illustrates a flowchart of processing performed by the data harvest system to adaptively facilitate the discovery, transfer, and distribution of pertinent data and knowledge based on user profiles developed through analyses of user search queries, in accordance with various embodiments of the present teachings.
Figure 3:
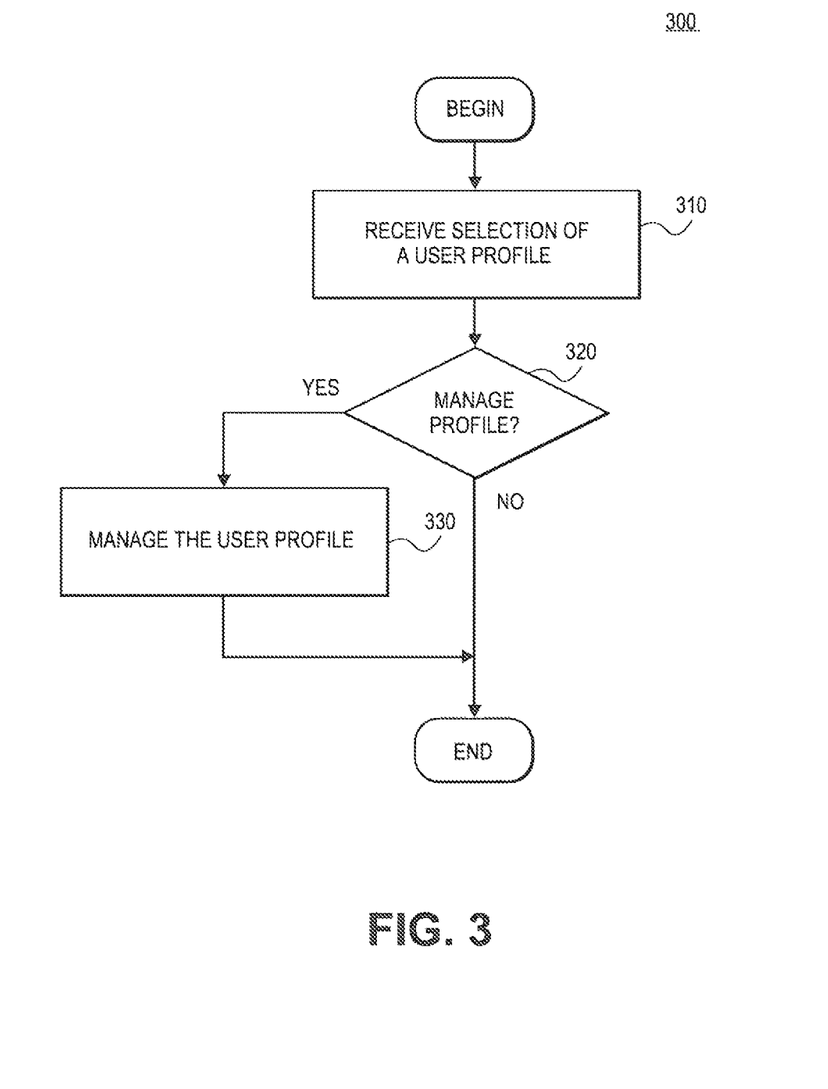
FIG. 3 illustrates a flowchart of processing performed by the data harvest system to view or modify user profiles through a user interface, in accordance with various embodiments of the present teachings.

FIGS. 2 and 3 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 2 illustrates a flowchart of processing 200 that can be performed by data harvest system 100 to adaptively facilitate the discovery, transfer, and distribution of pertinent data and knowledge based on user profiles developed through analyses of user search queries, in accordance with various embodiments of the present teachings. Processing 200 begins in 210, during which data harvest system 100 can use search query analyzer 110 and/or data harvest system client 160 to monitor search queries made by a user using search tools 180, to determine and learn what the user is interested in based on search terms, syntax, and/or context used in the user's search queries. Search query analyzer 110 can continuously or periodically monitor search tools 180, which can include web portals and existing search engines.

For illustration purposes, exemplary screen shots of user interfaces provided by search tools 180 are shown in FIGS. 4A and 4B. In an embodiment as shown in FIG. 4A, data harvest system 100 can use data harvest system client 160 to provide a web portal 400 that allows the user to query for and retrieve documents. Examples of web portal 400 can be one or more web portals provided by DCGS-A, Intelink, SIPRNet, and the like. Web portal 400 can include a search query entry 410 for receiving the user's search query, and selection buttons 420-428 for allowing the user to select one or more data sources to query against, view a collection of documents, retrieve stored queries, edit web portal preferences, log off the web portal, and the like. The data sources can include data repositories 190, data sources 195, and other sources of data. Web portal 400 can also include a status indicator 430 for displaying a status of the search query with respect to the data sources. In another embodiment as shown in FIG. 4B, data harvest system client 160 can interface with a search engine 450 (e.g., GOOGLE™ search engine, BING™ by Microsoft Corporation, and the like). Search engine 450 can include a search query entry 460 for receiving the user's search query and provide search results 470 responsive to the search query.

Returning to FIG. 2, in 215, data harvest system 100 can use search query analyzer 110 and/or data harvest system client 160 to capture and analyze the user's search queries in order to identify and harvest concepts in the search queries. In various embodiments, search query analyzer 110 can utilize concept knowledge base 140 to audit search terms in the user's search queries to identify and extract one or more known concepts in the search queries. Search query analyzer 110 can also recognize and identify one or more new concepts in the search queries, and can add the new concepts in concept knowledge base 140 for future reference. By capturing and analyzing the user's search queries, search query analyzer 110 can determine and learn what the user is interested in based on search terms, syntax, and/or context used in the user's search queries.

Next, in 220, data harvest system 100 can use user profile builder 132 to associate the concepts identified by search query analyzer 110 with the user's profile. User profile builder 132 can also classify search terms and concepts in the user profile based on how frequently they have been used in the user's search queries. User profile builder 132 can build the user's profile based on the concepts related to the user's search queries or search results provided in response to the search queries, so that data harvester 120 can analyze the concepts in the user's profile and adaptively identify and harvest data pertinent or of interest to that user. User profile builder 132 can also build the user's profile based on a frequency in which particular search terms and/or concepts are used in the search queries. Over time, the user's profile develops a baseline of understanding of the user's interests and habits. Exemplary representations of user profiles at various stages of development are illustrated in FIGS. 5A and 5B. For example, a senior user profile can include a well-defined model 500 of the senior user's interests 510 and search contexts 520, while a junior user profile can include an incomplete model 550 of the junior user's interests 560 and search contexts 570.

As shown in FIG. 5A, well-defined model 500 can include a robust listing of concepts, such as topics of interest and/or search contexts, that have been identified from the senior user's search queries over a long period of time. Well-defined model 500 can also include a ranking of the identified concepts based on how frequently they were used in the senior user's search queries, with the most frequently used concepts listed at the top of the ranking and less frequently used concepts listed further down the ranking. In contrast, as shown in FIG. 5B, incomplete model 550 can include a less robust listing of concepts that have been identified from the junior user's search queries over a short period of time, with some slots of the listing left empty. Incomplete model 550 can also include a partial ranking of the identified concepts. In various embodiments, data harvest system 100 can enable the user or an administrator to modify the user's profile separately from user-entered search queries. For example, as shown in FIG. 5A, concept actions 530 and 540 allow the senior user or the administrator to modify a ranking of concepts associated with the senior user's profile, add or associate a new concept with the senior user's profile, and the like. Similarly, in an example as shown in FIG. 5B, concept actions 580 and 590 allow the junior user or the administrator to modify a ranking of concepts associated with the junior user's profile, add or associate a new concept with the junior user's profile, and the like.

In 225, data harvest system 100 can use user profile linker 134 to link the user's profile to profiles of other users in a network or networks based on, for example, search terms or concepts that the users share. User profile linker 134 can monitor the user's search queries and automatically link together the user's profile with profiles of other users having shared concepts, e.g., common interests, similar topics of interest, similar search contexts, and the like. User profile linker 134 can also determine one or more data sources (e.g., data repositories 190, data sources 195, etc.) that are relevant to the user based on the user's profile, and can link the relevant data sources to the user's profile. Furthermore, user profile linker 134 can also rank the other users based on a similarity between the other users' profiles and the user's profile, and then display the other users according to their ranked similarity.

Then, in 230, data harvest system 100 can use data harvester 120 to identify and harvest pertinent data by using search terms or concepts associated with the user's profile and/or other users' profiles linked to the user's profile. Data harvest system 100 can also use real-time data notification module 150 to notify the user of the harvested data, an example of which is shown in FIG. 6 that illustrates a screenshot of an exemplary user interface 600 provided by data harvester 120 to a user. User interface 610 can include a listing 610 of articles, an article summary 620, and an article body 630. Data harvester can retrieve listing 610 of articles based on concepts associated with the user's profile. Listing 610 of articles can include a link 612 to an article, which the user can select to review the article, and can include a related concept listing 614, which displays concepts contained in the article that are related to the concepts associated with the user's profile. Article summary 620 can display a summary of the article selected by the user, and can highlight terms of interest that correspond to the concepts associated with the user's profile.

By factoring in the interests and habits of the users, either individually or collectively, data harvest system 100 can greatly reduce the time and resources required to search for and gather data and information pertinent or of interest to a user while improving the relevance and usefulness of the gathered data. Moreover, data harvest system 100 can assist the user in finding and collaborating with other users in a network or networks that have common interests or shared concepts, regardless of their locations or affiliated agencies, thus facilitating the discovery, transfer, and distribution of pertinent data or knowledge. Furthermore, data harvest system 100 can track search queries made by the other users whose profiles are linked to the user's profile, and then identify data pertinent or of interest to the user based on the other users' search queries or responses to those search queries. Finally, in 240, data harvest system 100 determines whether or not to continue monitoring search queries. If yes, then processing 200 returns to 210; if not, then processing 200 ends.

FIG. 3 illustrates a flowchart of processing 300 that can be performed by data harvest system 100 to view or modify user profiles through a user interface and separately from user-entered search queries, in accordance with various embodiments of the present teachings. Processing 300 begins in 310, during which data harvest system 100 can utilize user profile manager 136 to receive a selection of a user's profile for viewing and/or modification by the user or an administrator. Next, in 320, data harvest system 100 determines whether or not to allow the user or administrator to manage the user's profile, based on, for example, whether or not the user or administrator has permission or sufficient administrative privilege to manage the user's profile. If yes, then processing 300 continues to 330, during which user profile manager 136 allows the user or administrator to manage the user's profile; if not, then processing 300 ends. In 330, user profile manager 136 allows the user or administrator to modify the user's profile by changing a ranking of search terms or concepts identified or inferred from the user's search queries or search results provided In response to those search queries, changing a clustering or grouping of the search terms or concepts, removing search terms used in the user's search queries, merging the user's concepts with concepts associated with other users' profiles, removing a concept from the user's profile, or associating a new concept with the user's profile.

FIG. 7 illustrates a screenshot of an exemplary user interface 700 provided by user profile manager 136, in which user profile manager 136 displays other users 710 linked to the user, displays a listing 720 of concepts, including topics of interest and/or search contexts, associated with the user, and provides the user with an option 730 to merge, retrieve, or inherit another user's concepts with her own. User profile manager 136 can allow the user or administrator to search for other users that share similar concepts in their user profiles or have used similar search terms. User profile manager 136 can also assist trainers and management in reviewing the user's profile and the user's analytical patterns, for example, by displaying a development history or snapshots of user profiles on an individual or a collective basis. For instance, user profile manager 136 can create a visual display to illustrate the growth of a user's knowledge related to a concept and the search strategies, tactics, techniques, and procedures that the user employed to find information pertinent to the concept.

FIG. 8 illustrates a computer system 800 that is consistent with embodiments of the present teachings. In general, embodiments of data harvest system 100 may be implemented in various computer systems, such as a personal computer, a server, a workstation, an embedded system, or a combination thereof, for example, computer system 800. Certain embodiments of data harvest system 100 may be embedded as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. However, for purposes of explanation, system 800 is shown as a general purpose computer that is well known to those skilled in the art. Examples of the components that may be included in system 800 will now be described.

As shown, system 800 may include at least one processor 802, a keyboard 817, a pointing device 818 (e.g., a mouse, a touchpad, and the like), a display 816, main memory 810, an input/output controller 815, and a storage device 814. Storage device 814 can comprise, for example, RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. A copy of the computer program embodiment of data harvest system 100 can be stored on, for example, storage device 814. System 800 may also be provided with additional input/output devices, such as a printer (not shown). The various components of system 800 communicate through a system bus 812 or similar architecture. In addition, system 800 may include an operating system (OS) 820 that resides in memory 810 during operation. One skilled in the art will recognize that system 800 may include multiple processors 802. For example, system 800 may include multiple copies of the same processor. Alternatively, system 800 may include a heterogeneous mix of various types of processors. For example, system 800 may use one processor as a primary processor and other processors as co-processors. For another example, system 800 may include one or more multi-core processors and one or more single core processors. Thus, system 800 may include any number of execution cores across a set of processors (e.g., processor 802). As to keyboard 817, pointing device 818, and display 816, these components may be implemented using components that are well known to those skilled in the art. One skilled in the art will also recognize that other components and peripherals may be included in system 800.

Main memory 810 serves as a primary storage area of system 800 and holds data that is actively used by applications, such as data harvest system 100, running on processor 802. One skilled in the art will recognize that applications are software programs that each contains a set of computer instructions for instructing system 800 to perform a set of specific tasks during runtime, and that the term "applications" may be used interchangeably with application software, application programs, and/or programs in accordance with embodiments of the present teachings. Memory 810 may be implemented as a random access memory or other forms of memory as described below, which are well known to those skilled in the art.

OS 820 is an integrated collection of routines and instructions that are responsible for the direct control and management of hardware in system 800 and system operations. Additionally, OS 820 provides a foundation upon which to run application software. For example, OS 820 may perform services, such as resource allocation, scheduling, input/output control, and memory management. OS 820 may be predominantly software, but may also contain partial or complete hardware implementations and firmware. Well known examples of operating systems that are consistent with the principles of the present teachings include Linux™, Mac OS™ by Apple Computer, Solaris™ by Sun Microsystems, Windows™ (e.g., Windows CE™, Windows NT™, Windows 2000™, Windows XP™, and Windows Vista™) by Microsoft Corporation, Open VMS™, and AIX™ by IBM.

The foregoing description is illustrative, and variations in configuration and implementation may occur to persons skilled in the art. For instance, the various illustrative logics, logical blocks, modules, and circuits described in connection with the embodiments disclosed herein may be implemented or performed with a general purpose processor (e.g., processor 802), a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. For a software implementation, the techniques described herein can be implemented with modules (e.g., procedures, functions, subprograms, programs, routines, subroutines, modules, software packages, classes, and so on) that perform the functions described herein. A module can be coupled to another module or a hardware circuit by passing and/or receiving information, data, arguments, parameters, or memory contents. Information, arguments, parameters, data, or the like can be passed, forwarded, or transmitted using any suitable means including memory sharing, message passing, token passing, network transmission, and the like. The software codes can be stored in memory units and executed by processors. The memory unit can be implemented within the processor or external to the processor, in which case it can be communicatively coupled to the processor via various means as is known in the art.

If implemented in software, the functions may be stored on or transmitted over a computer-readable medium as one or more instructions or code. Computer-readable media includes both tangible computer storage media and communication media including any medium that facilitates transfer of a computer program from one place to another. A storage media may be any available tangible media that can be accessed by a computer. By way of example, and not limitation, such tangible computer-readable media can comprise RAM, ROM, flash memory, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, DVD, floppy disk and blu-ray disc where disks usually reproduce data magnetically, while discs reproduce data optically with lasers. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media. Resources described as singular or integrated can in one embodiment be plural or distributed, and resources described as multiple or distributed can in embodiments be combined. The scope of the present teachings is accordingly intended to be limited only by the following claims.

What is claimed is:

1. A method for providing pertinent data to a user, comprising:

analyzing, by a processor, search activity of a user to identify a concept related to the search activity, wherein the search activity includes at least one of a search query or a search result returned in response to the search query;

modifying a user profile of the user to include the concept in a set of concepts associated with the user profile, wherein data pertinent to the user is identified based on the set of concepts associated with the user profile;

linking the user profile to one or more profiles of one or more other users based on a similarity between the set of concepts associated with the user profile and one or more concepts associated with the one or more profiles of the one or more other users;

tracking search queries made by the one or more other users subsequent to linking the user profile to the one or more profiles of the one or more other users;

determining one or more linked concepts based directly on at least one of the search queries or search results returned in response to the search queries;

modifying the set of concepts associated with the user profile based on the one or more linked concepts to form a modified set of concepts; and updating a development history of the user profile with a snapshot of the user profile having the modified set of concepts, wherein the development history includes a plurality of snapshots of the user profile each having an associated set of concepts.

2. The method of claim 1, wherein the concept includes at least one of a topic of interest related to the search query, a search context related to the search query, or the search result.

3. The method of claim 1, wherein analyzing the search activity of the user further comprises:

auditing one or more search terms in the search activity against a concept knowledge base;

determining that the one or more search terms are not stored in the concept knowledge base; and storing the one or more search terms in the concept knowledge base.

4. The method of claim 1, wherein the plurality of snapshots in the development history includes at least one snapshot of the user profile having at least one associated set of concepts obtained prior to modifying the set of concepts, and wherein updating the development history of the user profile further comprises:

obtaining the snapshot of the user profile having the modified set of concepts; and adding the snapshot to the plurality of snapshots in the development history.

5. The method of claim 1, wherein modifying the user profile further comprises:

determining that the concept is not included in the set of concepts associated with the user profile; and adding the concept to the set of concepts associated with the user profile.

6. The method of claim 1, wherein modifying the user profile further comprises:

determining that the concept is included in the set of concepts associated with the user profile; and modifying the user profile to reflect a frequency in which the concept is searched for by the user.

7. The method of claim 1, further comprising:

providing a ranking of the one or more other users based on the similarity between the user profile and the one or more profiles of the one or more other users.

8. The method of claim 1, further comprising:

merging at least one concept associated with at least one of the one or more profiles of the one or more other users with the set of concepts associated with the user profile.

9. The method of claim 1, further comprising:

modifying the user profile based on user input separate from the search query.

10. A method for providing pertinent data to a user, comprising:

retrieving a set of concepts associated with a user profile of the user;

identifying one or more profiles of one or more other users that are linked to the user profile based on a similarity between the set of concepts and one or more linked concepts associated with the one or more profiles of the one or more other users;

tracking a search query made by the one or more other users;

identifying, by a processor, data pertinent to the user based directly on at least one of the search query or a search result returned in response to the search query;

notifying the user of the data identified to be pertinent to the user;

determining at least one linked concept based directly on at least one of the search query or the search result returned in response to the search query;

modifying the set of concepts associated with the user profile based on the at least one linked concept to form a modified set of concepts; and updating a development history of the user profile with a snapshot of the user profile having the modified set of concepts, wherein the development history includes a plurality of snapshots of the user profile each having an associated set of concepts.

11. The method of claim 10, wherein the plurality of snapshots in the development history includes at least one snapshot of the user profile having at least one associated set of concepts obtained prior to modifying the set of concepts, and wherein updating the development history of the user profile further comprises:

obtaining the snapshot of the user profile having the modified set of concepts; and adding the snapshot to the plurality of snapshots in the development history.

12. The method of claim 10, further comprising:

receiving at least one search query from the user;

analyzing, by a processor, the at least one search query to identify a concept based on one or more search terms in the at least one search query;

auditing the one or more search terms against a knowledge base;

determining the concept based on the one or more search terms audited against the knowledge base; and adding the concept to the set of concepts.

13. The method of claim 10, further comprising:

modifying at least one search query received from the user based on the one or more linked concepts associated with the one or more profiles of the one or more other users.

14. A non-transitory computer-readable medium having stored thereon instructions that, when executed by a processor, performs a method for providing pertinent data to a user, the method comprising:

analyzing, by the processor, search activity of a user to identify a concept related to the search activity, wherein the search activity includes at least one of a search query or a search result returned in response to the search query;

modifying a user profile of the user to include the concept in a set of concepts associated with the user profile, wherein data pertinent to the user is identified based on the set of concepts associated with the user profile;

linking the user profile to one or more profiles of one or more other users based on a similarity between the set of concepts associated with the user profile and one or more concepts associated with the one or more profiles of the one or more other users;

tracking search queries made by the one or more other users subsequent to linking the user profile to the one or more profiles of the one or more other users;

determining one or more linked concepts based directly on at least one of the search queries or search results returned in response to the search queries;

modifying the set of concepts associated with the user profile based on the one or more linked concepts to form a modified set of concepts; and updating a development history of the user profile with a snapshot of the user profile having the modified set of concepts, wherein the development history includes a plurality of snapshots of the user profile each having an associated set of concepts.

15. The computer-readable medium of claim 14, wherein the concept includes at least one of a topic of interest related to the search query, a search context related to the search query, or the search result.

16. The computer-readable medium of claim 14, wherein the method further comprises:
   auditing one or more search terms in the search activity against a concept knowledge base;
   determining that the one or more search terms are not stored in the concept knowledge base; and
   storing the one or more search terms in the concept knowledge base.

17. The computer-readable medium of claim 14, wherein the plurality of snapshots in the development history includes at least one snapshot of the user profile having at least one associated set of concepts obtained prior to modifying the set of concepts, and wherein the method further comprises:
   obtaining the snapshot of the user profile having the modified set of concepts; and
   adding the snapshot to the plurality of snapshots in the development history.

18. The computer-readable medium of claim 14, wherein the method further comprises:
   determining that the concept is not included in the set of concepts associated with the user profile; and
   adding the concept to the set of concepts associated with the user profile.

19. The computer-readable medium of claim 14, wherein the method further comprises:
   determining that the concept is included in the set of concepts associated with the user profile; and
   modifying the user profile to reflect a frequency in which the concept is searched for by the user.

20. The computer-readable medium of claim 14, wherein the method further comprises:
   providing a ranking of the one or more other users based on the similarity between the user profile and the one or more profiles of the one or more other users.

21. The computer-readable medium of claim 14, wherein the method further comprises:
   merging at least one concept associated with at least one of the one or more profiles of the one or more other users with the set of concepts associated with the user profile.

22. The computer-readable medium of claim 14, wherein the method further comprises:
   modifying the user profile based on user input separate from the search query.

* * * * *